(12) United States Patent
Masaki et al.

(10) Patent No.: US 11,097,621 B2
(45) Date of Patent: Aug. 24, 2021

(54) POWER SOURCE SYSTEM FOR ELECTRIC-POWERED VEHICLE

(71) Applicant: SUBARU CORPORATION, Tokyo (JP)

(72) Inventors: Shinichiro Masaki, Tokyo (JP); Takashi Inoue, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/717,539

(22) Filed: Dec. 17, 2019

(65) Prior Publication Data

US 2020/0298710 A1  Sep. 24, 2020

(30) Foreign Application Priority Data

Mar. 22, 2019  (JP) ................. 2019-054520

(51) Int. Cl.
| | | |
|---|---|---|
| *H02P 1/00* | (2006.01) | |
| *B60L 15/20* | (2006.01) | |
| *H02P 27/06* | (2006.01) | |
| *H02M 7/5387* | (2007.01) | |
| *B60L 53/22* | (2019.01) | |
| *B60L 58/10* | (2019.01) | |
| *B60L 50/60* | (2019.01) | |

(52) U.S. Cl.
CPC .......... *B60L 15/2045* (2013.01); *B60L 50/66* (2019.02); *B60L 53/22* (2019.02); *B60L 58/10* (2019.02); *H02M 7/5387* (2013.01); *H02P 27/06* (2013.01); *B60L 2210/10* (2013.01)

(58) Field of Classification Search
CPC ...... B60L 15/2045; B60L 53/22; B60L 50/66; B60L 58/10; B60L 2210/10; H02M 7/5387; H02P 27/06; H02P 2201/09; H02P 29/028; H02P 4/00
See application file for complete search history.

(56) References Cited

U.S. PATENT DOCUMENTS

| | | | |
|---|---|---|---|
| 2012/0288777 A1* | 11/2012 | Kazuno | ............. H01M 8/04753 429/432 |
| 2017/0349048 A1 | 12/2017 | Nakayama et al. | |
| 2019/0381898 A1* | 12/2019 | Kobayashi | ............... B60L 7/10 |

FOREIGN PATENT DOCUMENTS

| | | | |
|---|---|---|---|
| JP | 2017-218013 A | | 12/2017 |
| JP | 2017229132 A | * | 12/2017 |

* cited by examiner

*Primary Examiner* — Karen Masih
(74) *Attorney, Agent, or Firm* — McGinn IP Law Group, PLLC

(57) ABSTRACT

In a power source system, a high-voltage battery and a low voltage battery are configured to store electric powers to be supplied to a traveling motor and an accessory, respectively. A step-up unit is interposed between the low-voltage battery and the traveling motor, and is configured to step up a voltage of the low-voltage battery and apply the stepped-up voltage to the traveling motor. A controller is configured to perform switching to a normal-time electric power supply circuit, in which the high-voltage battery and the traveling motor are coupled to each other, when the high-voltage battery is in a normal state and perform switching to an abnormal-time electric power supply circuit, in which the low-voltage battery and the traveling motor are coupled to each other via the step-up unit, when the high-voltage battery is in an abnormal state.

20 Claims, 10 Drawing Sheets

POWER SOURCE SYSTEM FOR ELECTRIC-POWERED VEHICLE

CROSS-REFERENCE TO RELATED APPLICATIONS

The present application claims priority from Japanese Patent Application No. 2019-054520 filed on Mar. 22, 2019, the entire contents of which are hereby incorporated by reference.

BACKGROUND

The technology relates to a power source system for an electric-powered vehicle.

A power source system for an electric-powered vehicle driven by an electric motor includes a high-voltage battery serving as an electric power supply source, and an electric power to be supplied to the electric motor is stored in the high-voltage battery, as disclosed in Japanese Unexamined Patent Application Publication No. 2017-218013. The electric motor is referred to below as a "traveling motor."

SUMMARY

An aspect of the technology provides a power source system for an electric-powered vehicle. The electric-powered vehicle includes a traveling motor. The power source system includes a high-voltage battery, a low-voltage battery, a step-up unit, and a controller. The high-voltage battery is configured to store an electric power to be supplied to the traveling motor. The low-voltage battery is configured to store an electric power to be supplied to an accessory provided in the electric-powered vehicle. The step-up unit is interposed between the low-voltage battery and the traveling motor. The step-up unit is configured to step up a voltage of the low-voltage battery and apply the stepped-up voltage to the traveling motor. The controller is configured to perform switching to a normal-time electric power supply circuit when the high-voltage battery is in a normal state and perform switching to an abnormal-time electric power supply circuit when the high-voltage battery is in an abnormal state. The normal-time electric power supply circuit is a circuit in which the high-voltage battery and the traveling motor are coupled to each other. The abnormal-time electric power supply circuit is a circuit in which the low-voltage battery and the traveling motor are coupled to each other via the step-up unit.

An aspect of the technology provides a power source system for an electric-powered vehicle. The electric-powered vehicle includes a traveling motor. The power source system includes a high-voltage battery, a low-voltage battery, a step-up unit, and a controller. The high-voltage battery is configured to supply an electric power to the traveling motor. The low-voltage battery is coupled to the traveling motor in parallel to the high-voltage battery. The low-voltage battery has a lower voltage than the high-voltage battery. The step-up unit is interposed between the low-voltage battery and the traveling motor. The step-up unit is configured to step up a voltage of the low-voltage battery and apply the stepped-up voltage to the traveling motor. The controller is configured to perform switching of an electric power source that supplies an electric power to the traveling motor between a time when the high-voltage battery is in a normal state and a time when the high-voltage battery is in an abnormal state. The controller is configured to select the high-voltage battery as the electric power source when the high-voltage battery is in the normal state and select the low-voltage battery as the electric power source when the high-voltage battery is in the abnormal state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
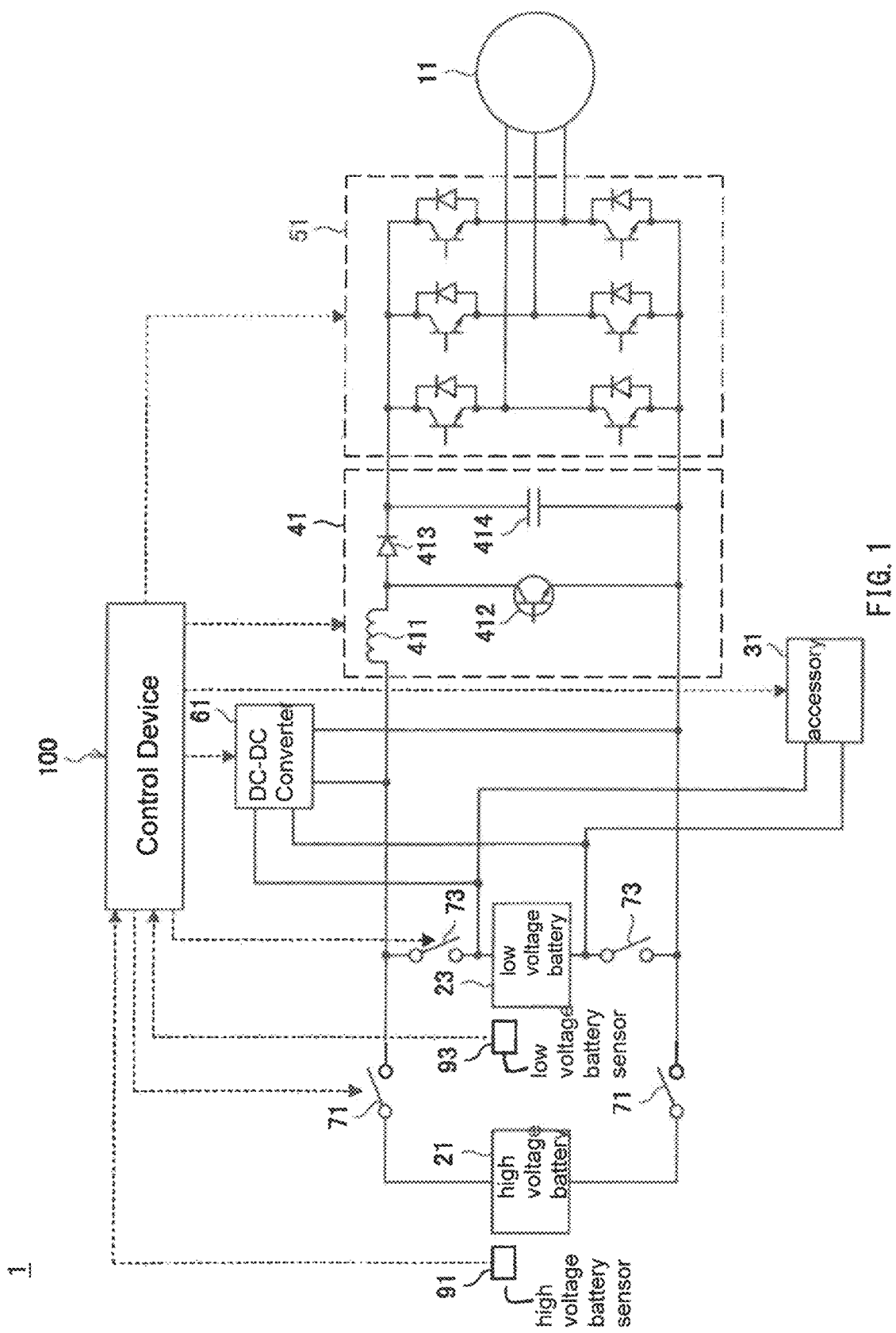
FIG. 1 is a schematic diagram illustrating an example of an outline configuration of a power source system according to one example embodiment of the technology.

Hereinafter, some example embodiments of the technology will be described in detail with reference to the appended drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. In the present specification and the drawings, components having substantially identical functional configurations are given identical reference characters, and duplicate descriptions thereof will be omitted.

A power source system described below may be mounted in an electric-powered vehicle, such as an electric vehicle (EV) or a hybrid electric vehicle (HEV), and used to supply an electric power to each device in the vehicle, for example. It suffices that the electric-powered vehicle in which the power source system described below is mounted be a vehicle that includes a traveling motor serving as a driving source directed to driving of a driving wheel. In one example, the electric-powered vehicle may include a railway vehicle.

The power source system described below is an example of a power source system for an electric-powered vehicle according to an example embodiment of the technology. As will be described later, a configuration of the power source system for an electric-powered vehicle according to an example embodiment of the technology is not limited to the specific configuration of the power source system described below.

[1. First Example Embodiment]

A power source system 1 according to a first example embodiment of the technology will be described.

[1-1. Configuration of Power Source System]

Figure 2:
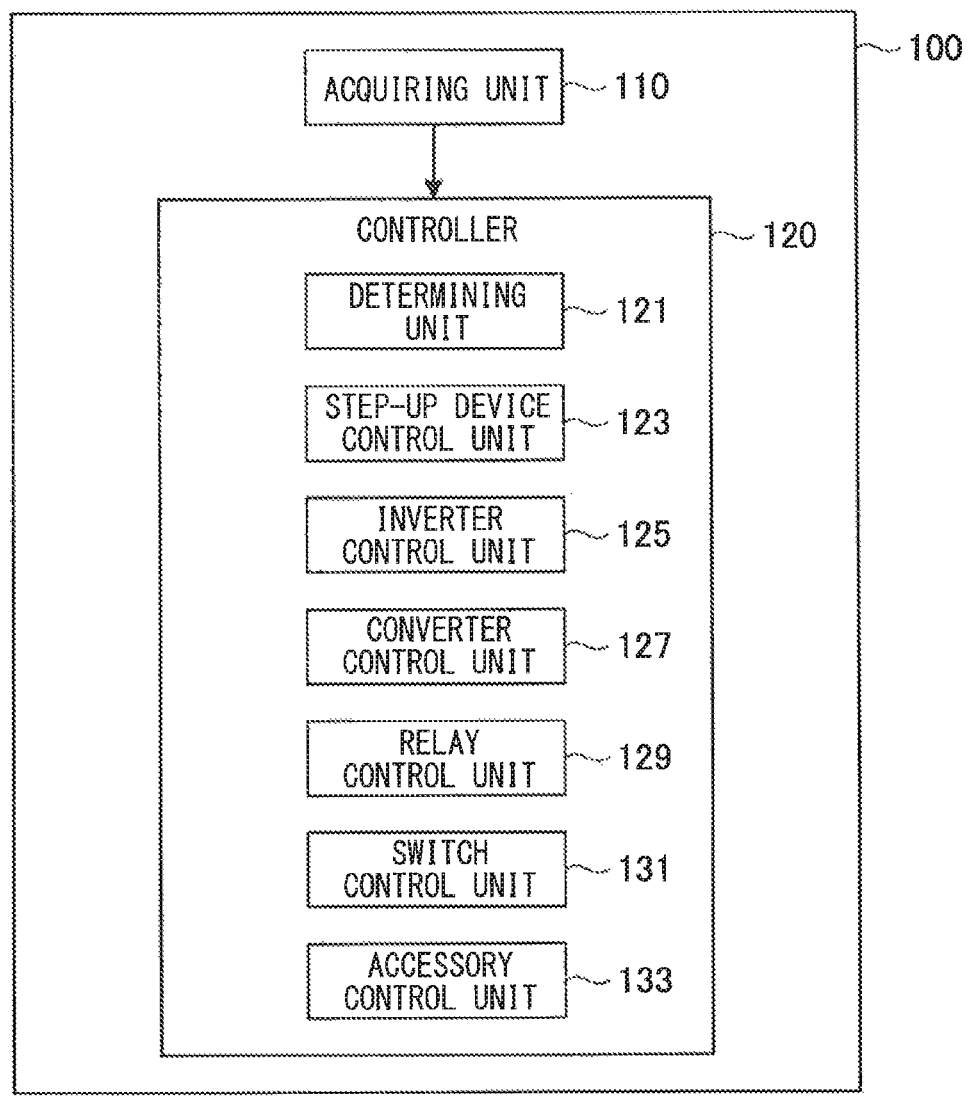
FIG. 2 is a block diagram illustrating an example of a configuration of a control device according to one example embodiment.

First, with reference to FIGS. 1 and 2, an outline configuration of the power source system 1 according to the first example embodiment will be described. FIG. 1 is a schematic diagram illustrating an example of an outline configuration of the power source system 1. FIG. 2 is a block diagram illustrating an example of a configuration of a control device 100.

As illustrated in FIG. 1, the power source system 1 may include a traveling motor 11, a high-voltage battery 21, a low-voltage battery 23, an accessory 31, a step-up device 41, and a control device 100. The power source system 1 may further include an inverter 51, a direct-current-to-direct-current (DC-DC) converter 61, a relay 71, a switch 73, a high-voltage battery sensor 91, and a low-voltage battery sensor 93. The power source system 1 according to the first example embodiment may be mounted in an electric vehicle that includes only the traveling motor 11 as a driving source directed to driving of a driving wheel. In one embodiment, the relay 71 may serve as a "relay." In one embodiment, the switch 73 may serve as a "switch."

The high-voltage battery 21 stores an electric power to be supplied to the traveling motor 11. In a specific but non-limiting example, the high-voltage battery 21 may have a higher voltage than the low-voltage battery 23. For example, the high-voltage battery 21 may have a voltage of 100 V. For the high-voltage battery 21, a secondary battery, such as a lithium-ion battery or a nickel-hydrogen battery, may be used, for example.

In a specific but non-limiting example, the high-voltage battery 21 may be coupled to the traveling motor 11 via the inverter 51. The step-up device 41 may be provided between the high-voltage battery 21 and the inverter 51. This configuration may allow an electric power outputted from the high-voltage battery 21 to be supplied to the traveling motor 11 via the step-up device 41 and the inverter 51. In a more specific but non-limiting example, the configuration may allow an electric power outputted from the high-voltage battery 21 may be subjected to voltage step-up by the step-up device 41, subjected to conversion from a direct-current electric power to an alternating-current electric power by the inverter 51, and may be supplied to the traveling motor 11. In this example, the relay 71 may be provided between the high-voltage battery 21 and the step-up device 41. The relay 71 may be configured to allow for or cut off electrical coupling between the high-voltage battery 21 and the step-up device 41. A precharge resistance and a precharge relay may be provided in parallel to the relay 71, from the viewpoint of protecting the power source system 1 from an inrush current of the high-voltage battery 21 generated when the relay 71 opens or closes.

The traveling motor 11 may be configured to output a motive power directed to driving of the driving wheel. For the traveling motor 11, a polyphase motor, e.g., a three-phase motor, may be used, for example. Basically, the traveling motor 11 may generate the motive power with the use of an electric power supplied from the high-voltage battery 21.

The inverter 51 may be an electric power converter configured to execute electric power conversion between a direct current and an alternating current. In a specific but non-limiting example, the inverter 51 may include a polyphase bridge circuit. In a more specific but non-limiting example, the inverter 51 may include a diode and a switching element. Controlling of an operation of the switching element may cause conversion between a direct current and an alternating current to be executed.

The step-up device 41 may be an electric power converter that is configured to step up a voltage of the high-voltage battery 21 and apply the stepped-up voltage to the inverter 51. The step-up device 41 may include a chopper circuit, for example. The step-up device 41 may include a switching element, for example. Controlling of an operation of the switching element may cause the step-up of the voltage.

In a specific but non-limiting example, the step-up device 41 may include a coil 411, a switching element 412, a diode 413, and a capacitor 414. The switching element 412 may be a bipolar transistor, for example. One end of the coil 411 may be coupled to positive electrode side of the high-voltage battery 21. The other end of the coil 411 may be coupled to anode side of the diode 413. Cathode side of the diode 413 may be coupled to the inverter 51. A collector of the switching element 412 may be coupled to the coil 411 on the side of the diode 413. An emitter of the switching element 412 may be coupled to negative electrode side of the high-voltage battery 21. The capacitor 414 may be coupled to the cathode side of the diode 413 in parallel to the high-voltage battery 21. A base of the switching element 412 may be coupled to a control circuit that is configured to control an on/off state of the switching element 412.

In the step-up device 41, turning-on of the switching element 412 may cause accumulation of electric energy in the coil 411 with the use of an electric power from the high-voltage battery 21. Furthermore, turning-off of the switching element 412 may cause discharging of electric energy accumulated in the coil 411. At this point, the electric energy accumulated in the coil 411 may be superposed on an electric power from the high-voltage battery 21, and the resulting electric power may be outputted. Accordingly, a voltage of the high-voltage battery 21 may be stepped up by switching of the switching element 412 between an on state and an off state in an alternating manner. A step-up ratio may be controlled by controlling of a duty ratio of the on/off state of the switching element 412.

In one embodiment, the step-up device 41 may serve as a step-up unit. In the power source system 1, as will be described later, the step-up device 41 may serve as a step-up unit that is configured to step up a voltage of the low-voltage battery 23 and apply the stepped-up voltage to the traveling motor 11 when the high-voltage battery 21 is in an abnormal state. The step-up device 41 may be able to step up the voltage of the low-voltage battery 23 when the high-voltage battery 21 is in the abnormal state under a principle similar to the principle behind the stepping up of the voltage of the high-voltage battery 21 described above.

In the first example embodiment, the inverter 51 and the step-up device 41 may each be a separate electric power converter. In an alternative example, the operations of the inverter 51 and the step-up device 41 may be performed in an integrated manner by a single electric power converter.

The low-voltage battery 23 may store an electric power to be supplied to the accessory 31. In a specific but non-limiting example, the low-voltage battery 23 may have a lower voltage than the high-voltage battery 21. For example, the low-voltage battery 23 may have a voltage of 12 V. For the low-voltage battery 23, a secondary battery, such as a lead-acid battery or a lithium-ion battery, may be used, for example.

In a specific but non-limiting example, the low-voltage battery 23 may be coupled to the step-up device 41 on the side of the high-voltage battery 21 via the DC-DC converter 61. The low-voltage battery 23 may be coupled in parallel to the high-voltage battery 21. This configuration may allow an electric power outputted from the high-voltage battery 21 to be supplied to the low-voltage battery 23 via the DC-DC converter 61. In a more specific but non-limiting example, the configuration may allow the voltage of the high-voltage battery 21 to be stepped down by the DC-DC converter 61, and the stepped-down voltage may be applied to the low-voltage battery 23. Furthermore, the low-voltage battery 23 may be coupled to the step-up device 41 on the side of the high-voltage battery 21 via the switch 73 to bypass the DC-DC converter 61. The switch 73 may be configured to allow for or cut off electrical coupling between the low-voltage battery 23 and the step-up device 41. The switch 73 may be a semiconductor switch, for example.

The DC-DC converter 61 may be an electric power converter that is configured to step down the voltage of the high-voltage battery 21 and apply the stepped-down voltage to the low-voltage battery 23. The DC-DC converter 61 may include a chopper circuit, for example. The DC-DC converter 61 may include a switching element, for example. The step-down of the voltage may be performed by controlling of an operation of the switching element.

The accessory 31 may include, for example but not limited to, various electrical components, electronic devices, air-conditioning devices for the interior of a vehicle compartment, and display devices that are provided to the electric-powered vehicle. The accessory 31 may include, for example, an air conditioner, a hazard warning lamp, a headlight, a windshield wiper, and various devices, such as a communication device. The communication device may perform communication with outside of the electric-powered vehicle. The communication device may perform, for example but not limited to, an operation of seeking help from the outside of the electric-powered vehicle when the high-voltage battery 21 is in the abnormal state, as will be described later. The accessory 31 may be coupled to the DC-DC converter 61 in parallel to the low-voltage battery 23. Accordingly, in the power source system 1, an electric power directed to driving of the accessory 31 may be supplied from the low-voltage battery 23. It is not a limiting example that the electric power directed to driving of the accessory 31 is supplied from the low-voltage battery 23, and the electric power directed to driving of the accessory 31 may instead be supplied from the high-voltage battery 21 via the DC-DC converter 61.

The high-voltage battery sensor 91 may detect the voltage of the high-voltage battery 21 and output a detection result to the control device 100.

The low-voltage battery sensor 93 may detect a remaining capacitance of the low-voltage battery 23 and output a detection result to the control device 100.

The control device 100 may include: for example but not limited to, a central processing unit (CPU) which is an arithmetic processing device; a read-only memory (ROM) which is a storage device that holds, for example but not limited to, a program and an arithmetic parameter to be used by the CPU; and a random-access memory (RAM) which is a storage device that temporarily holds, for example but not limited to, a parameter that varies as appropriate when the CPU executes an operation.

The control device 100 may communicate with each device included in the power source system 1. The control device 100 may communicate with each device through a controller area network (CAN) communication, for example.

A portion or all of operations of the control device 100 according to the first example embodiment may be distributed to a plurality of control devices, or a plurality of operations may be implemented by a single control device. For example, as will be described later, the operations of the control device 100 may include determining of the abnormal state of the high-voltage battery 21, controlling of an operation of the step-up device 41, and any other operation, and the aforementioned operations may be distributed to separate control devices. In a case where a portion or all of the operations of the control device 100 are distributed to a plurality of control devices, these control devices may be coupled to each other via a communication bus, such as the CAN.

As illustrated in FIG. 2, the control device 100 may include an acquiring unit 110 and a controller 120. In one embodiment, the controller 120 may serve as a "controller."

The acquiring unit 110 may acquire various pieces of information to be used in a process performed by the controller 120. The acquiring unit 110 may output the acquired information to the controller 120. For example, the acquiring unit 110 may communicate with sensors, including the high-voltage battery sensor 91 and the low-voltage battery sensor 93, to acquire various pieces of information outputted from the aforementioned sensors.

The controller 120 may control an operation of each device in the power source system 1. The controller 120 may include a determining unit 121, a step-up device control unit 123, an inverter control unit 125, a converter control unit 127, a relay control unit 129, a switch control unit 131, and an accessory control unit 133.

The determining unit 121 may determine whether the high-voltage battery 21 is in the abnormal state. For example, the determining unit 121 may determine whether the high-voltage battery 21 is in the abnormal state on the basis of the voltage of the high-voltage battery 21.

The step-up device control unit 123 may control an operation of the step-up device 41. In a specific but non-limiting example, the step-up device control unit 123 may control the operation of the step-up device 41 by controlling an operation of the switching element in the step-up device 41. Thereby, the step-up device control unit 123 may control conversion and supply of an electric power between the high-voltage battery 21 and the inverter 51. Furthermore, the step-up device control unit 123 may control conversion and supply of an electric power between the low-voltage battery 23 and the inverter 51 when the high-voltage battery 21 is in the abnormal state, as described later.

The inverter control unit 125 may control an operation of the inverter 51. In a specific but non-limiting example, the inverter control unit 125 may control an operation of the switching element in the inverter 51. Thereby, the inverter control unit 125 may control conversion and supply of an electric power between the step-up device 41 and the traveling motor 11.

The converter control unit 127 may control an operation of the DC-DC converter 61. In a specific but non-limiting example, the converter control unit 127 may control the operation of the DC-DC converter 61 by controlling an operation of the switching element in the DC-DC converter 61. Thereby, the converter control unit 127 may control conversion and supply of an electric power between the high-voltage battery 21 and the low-voltage battery 23.

The relay control unit 129 may control an operation of the relay 71. For example, the relay control unit 129 may control an opening-closing operation of the relay 71 by controlling an operation of an unillustrated driving device that drives the relay 71.

The switch control unit 131 may control an operation of the switch 73. For example, the switch control unit 131 may control an opening-closing operation of the switch 73 by outputting, to the switch 73, a control signal directed to opening or closing of the switch 73.

The accessory control unit 133 may control an operation of the accessory 31. In a specific but non-limiting example, the accessory control unit 133 may limit an output of the accessory 31. Limiting the output of the accessory 31 may include lowering the output of the accessory 31 and stopping the operation of the accessory 31.

In the power source system 1 according to the first example embodiment, an abnormal-time electric power supply circuit may be formed when the high-voltage battery 21 is in the abnormal state. In the abnormal-time electric power supply circuit, the low-voltage battery 23 and the traveling motor 11 may be coupled to each other via a step-up unit. The step-up unit may be configured to step up the voltage of the low-voltage battery 23 and apply the stepped-up voltage to the traveling motor 11. In a specific but non-limiting example, in the power source system 1 according to the first example embodiment, when the high-voltage battery 21 is in the abnormal state, a circuit may be formed in which the low-voltage battery 23 and the traveling motor 11 are coupled to each other via the step-up device 41 serving as a "step-up unit". This circuit may also be referred to below as a "first abnormal-time electric power supply circuit." This circuit may allow the electric-powered vehicle to take refuge at a safe location when the high-voltage battery 21 is in the abnormal state. Details of forming such a circuit will be described below. In one embodiment, the first abnormal-time electric power supply circuit may serve as an "abnormal-time electric power supply circuit."

[1-2. Operation of Power Source System]

Figure 3:
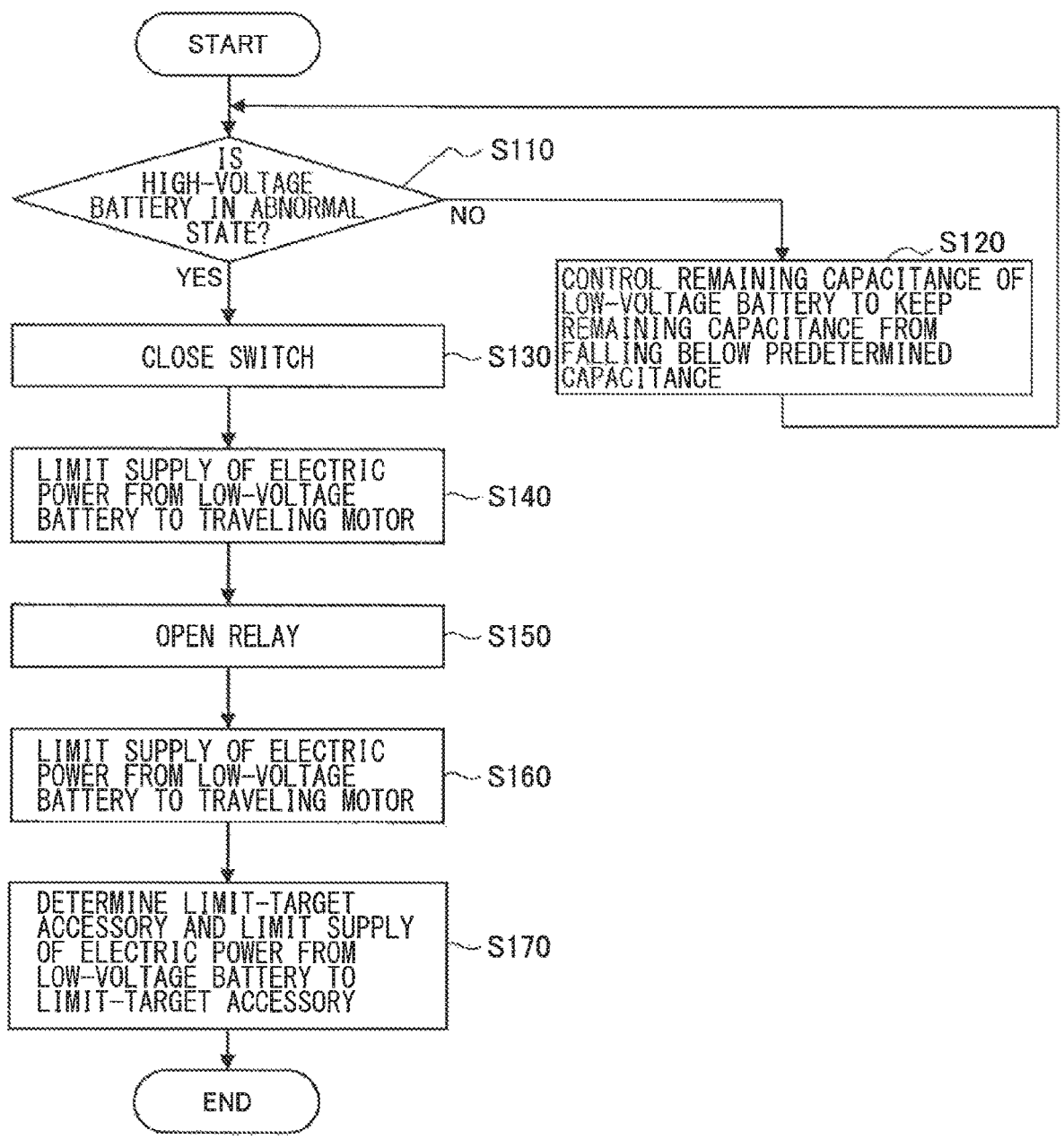
FIG. 3 is a flowchart illustrating an example of a flow of a process performed by the control device according to one example embodiment.
Figure 4:
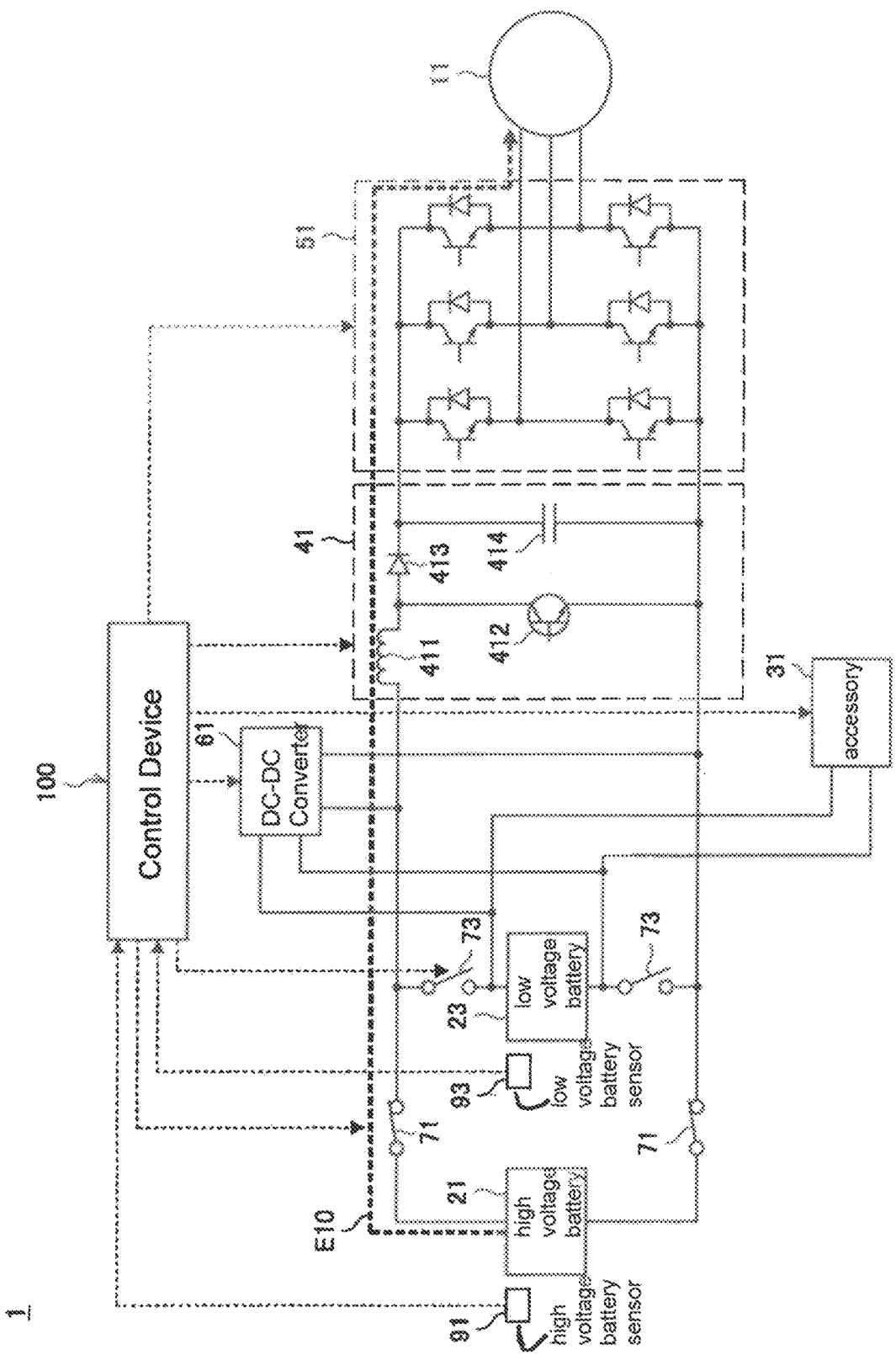
FIG. 4 is a schematic diagram illustrating an example of a state in which an electric power is supplied to a traveling motor in the power source system according to one example embodiment when a high-voltage battery is in a normal state.
Figure 5:
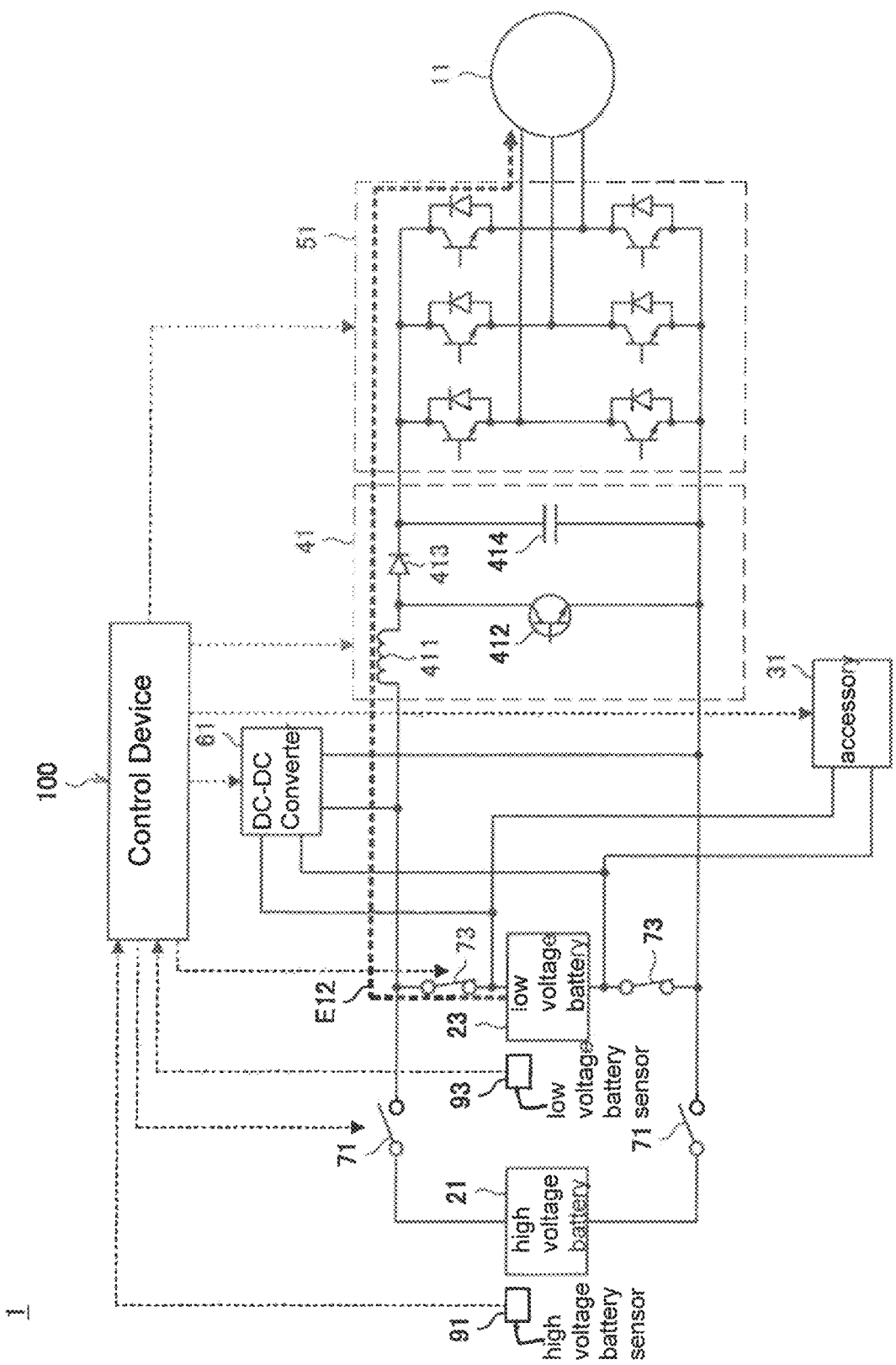
FIG. 5 is a schematic diagram illustrating an example of a state in which an electric power is supplied to the traveling motor in the power source system according to one example embodiment when the high-voltage battery in an abnormal state.

With reference to FIGS. 3 to 5, an operation of the power source system 1 according to the first example embodiment will be described.

FIG. 3 is a flowchart illustrating an example of a flow of a process performed by the control device 100. In a specific but non-limiting example, the control flow illustrated in FIG. 3 may start when the power source system 1 is started. FIG. 4 is a schematic diagram illustrating an example of a state in which an electric power is supplied to the traveling motor 11 in the power source system 1 when the high-voltage battery 21 is in a normal state. FIG. 5 is a schematic diagram illustrating an example of a state in which an electric power is supplied to the traveling motor 11 in the power source system 1 when the high-voltage battery 21 is in the abnormal state.

When the control flow illustrated in FIG. 3 is started, first, in step S110, the controller 120 may determine whether the high-voltage battery 21 is in the abnormal state. In a case where it is determined that the high-voltage battery 21 is in the abnormal state (YES in step S110), the control flow may proceed to step S130. In contrast, in a case where it is determined that the high-voltage battery 21 is in the normal state (NO in step S110), the control flow may proceed to step S120.

For example, the controller 120 may determine whether the high-voltage battery 21 is in the abnormal state on the basis of the voltage of the high-voltage battery 21. In a specific but non-limiting example, the controller 120 may determine that the high-voltage battery 21 is in the abnormal state in a case where the voltage of the high-voltage battery 21 is lower than a first determination value. The first determination value may be a lower limit value of the voltage that still allows the traveling motor 11 to be driven normally, for example. Furthermore, the controller 120 may determine that the high-voltage battery 21 is in the abnormal state in a case where the voltage of the high-voltage battery 21 is higher than a second determination value. The second determination value may be an upper limit value of the voltage that still allows the traveling motor 11 to be driven normally, for example. The first determination value and the second determination value are not limited to the above examples. For example, the first determination value and the second determination value may each be a value where a tolerance is put into consideration to the corresponding example value described above.

Now, with reference to FIG. 4, a flow of an electric power in the power source system 1 at a time when the high-voltage battery 21 is in the normal state will be described. As illustrated in FIG. 4, when the high-voltage battery 21 is in the normal state, the relay 71 may be closed, and the switch 73 may be open. While the relay 71 is closed, the high-voltage battery 21 and the step-up device 41 may be coupled to each other. Therefore, as illustrated in FIG. 4, a circuit may be formed in which the high-voltage battery 21 and the traveling motor 11 are coupled to each other via the step-up device 41 and the inverter 51. In one embodiment, this circuit may serve as a "normal-time electric power supply circuit." Furthermore, the controller 120 may so control an operation of the step-up device 41 and an operation of the inverter 51 as to supply an electric power outputted from the high-voltage battery 21 to the traveling motor 11 via the step-up device 41 and the inverter 51. Thereby, as indicated by an arrow E10 illustrated in FIG. 4, the electric power outputted from the high-voltage battery 21 may be supplied to the traveling motor 11 via the step-up device 41 and the inverter 51. The supplying of the electric power outputted from the high-voltage battery 21 to the traveling motor 11 in this manner may allow the traveling motor 11 to output the motive power directed to driving of the driving wheel. Furthermore, the controller 120 may so control the DC-DC converter 61 as to supply the electric power outputted from the high-voltage battery 21 to the low-voltage battery 23 via the DC-DC converter 61. Thereby, the electric power outputted from the high-voltage battery 21 may be supplied to the low-voltage battery 23 via the DC-DC converter 61, and the low-voltage battery 23 may be charged.

Referring back to FIG. 3, the description of the flow of the process performed by the control device 100 will continue. In a case where the determination is NO in step S110, that is, in a case where the high-voltage battery 21 is in the normal state, in step S120, the controller 120 may so control the remaining capacitance of the low-voltage battery 23 as to keep the remaining capacitance from falling below a predetermined capacitance.

As will be described later, in the power source system 1 according to the first example embodiment, the electric-powered vehicle may be allowed to perform refuge-taking traveling when the high-voltage battery 21 is in the abnormal state, by supplying of an electric power from the low-voltage battery 23 to various devices required for the refuge-taking traveling, such as the traveling motor 11. In the refuge-taking traveling, the electric-powered vehicle may travel to take refuge at a safe location when the high-voltage battery 21 is in the abnormal state. In one example embodiment, from the viewpoint of appropriately performing the refuge-taking traveling, the capacitance of the low-voltage battery 23 may be kept from being drained before the electric-powered vehicle completes the refuge-taking traveling when the high-voltage battery 21 is in the abnormal state. In the power source system 1 according to the first example embodiment, the controller 120 may so control the remaining capacitance of the low-voltage battery 23 as to keep the remaining capacitance from falling below the predetermined capacitance when the high-voltage battery 21 is in the normal state. In a specific but non-limiting example, the controller 120 may so control the remaining capacitance of the low-voltage battery 23 as to keep the remaining capacitance from falling below a reference capacitance by controlling the operation of the DC-DC converter 61. The reference capacitance may correspond to an electric power required for the electric-powered vehicle to perform the refuge-taking traveling when the high-voltage battery 21 is in the abnormal state. For example, the reference capacitance may be set to a lower limit at which an electric power is still supplied from the low-voltage battery 23 to various devices required for the refuge-taking traveling, such as the traveling motor 11, until the electric-powered vehicle completes the refuge-taking traveling when the high-voltage battery 21 is in the abnormal state. In one example, the reference capacitance may be set to a value in which a predetermined margin is added to the lower limit described above. This makes it possible to reduce a possibility that the capacitance of the low-voltage battery 23 is drained before the electric-powered vehicle completes the refuge-taking traveling when the high-voltage battery 21 is in the abnormal state.

In a case where the determination is YES in step S110, that is, in a case where the high-voltage battery 21 is in the abnormal state, in step S130, the controller 120 may close the switch 73.

The closing of the switch 73 may cause the low-voltage battery 23 and the step-up device 41 to be coupled to each other. Accordingly, the first abnormal-time electric power supply circuit may be formed in which the low-voltage battery 23 and the traveling motor 11 are coupled to each other via the step-up device 41 and the inverter 51.

Thereafter, in step S140, the controller 120 may control supply of an electric power from the low-voltage battery 23 to the traveling motor 11. In a specific but non-limiting example, the controller 120 may so control an operation of the step-up device 41 and an operation of the inverter 51 as to supply an electric power outputted from the low-voltage battery 23 to the traveling motor 11 via the step-up device 41 and the inverter 51.

Now, with reference to FIG. 5, a flow of an electric power in the power source system 1 at a time when the high-voltage battery 21 is in the abnormal state will be described. As described above, when the high-voltage battery 21 is in the abnormal state, the switch 73 may be closed, and thus the first abnormal-time electric power supply circuit may be formed. Furthermore, the controller 120 may so control an operation of the step-up device 41 and an operation of the inverter 51 as to supply an electric power outputted from the low-voltage battery 23 to the traveling motor 11 via the step-up device 41 and the inverter 51. Thereby, as indicated by an arrow E12 illustrated in FIG. 5, an electric power outputted from the low-voltage battery 23 may be supplied to the traveling motor 11 via the step-up device 41 and the inverter 51. The supplying of the electric power outputted from the low-voltage battery 23 to the traveling motor 11 in this manner may allow the traveling motor 11 to output a motive power directed to driving of the driving wheel. This allows the electric-powered vehicle to take refuge at a safe location when the high-voltage battery 21 is in the abnormal state.

In one example embodiment, the controller 120 may close the switch 73 at timing at which the voltage of an electric power supplied from the high-voltage battery 21 to the step-up device 41 falls below a predetermined value and start controlling supply of an electric power from the low-voltage battery 23 to the traveling motor 11. The predetermined value may be set to a value at which the low-voltage battery 23 is not negatively affected even if an electric power with a voltage of that value is input to the low-voltage battery 23, for example. This allows form reduction in a possibility that the low-voltage battery 23 is negatively affected and allows for suppression of any temporary cutoff of an electric power supplied to the traveling motor 11. In other words, it is possible to keep the traveling motor 11 from losing its power source.

Referring back to FIG. 3, the description of the flow of the process performed by the control device 100 will continue.

After step S140, in step S150, the controller 120 may open the relay 71.

Opening the relay 71 may cut off electrical coupling between the high-voltage battery 21 and the first abnormal-time electric power supply circuit. This makes it possible to reduce a possibility that an abnormal electric power is supplied from the high-voltage battery 21 to the step-up device 41 when the high-voltage battery 21 is in the abnormal. This also makes it possible to suppress flowing of an electric power outputted from the low-voltage battery 23 to the high-voltage battery 21 when the high-voltage battery 21 is in the abnormal state.

Thereafter, in step S160, the controller 120 may limit supply of an electric power from the low-voltage battery 23 to the traveling motor 11 to a level lower than that held when the high-voltage battery 21 is in the normal state. In a specific but non-limiting example, the controller 120 may limit supply of the electric power from the low-voltage battery 23 to the traveling motor 11 by controlling an operation of the inverter 51.

Typically, the capacity of the low-voltage battery 23 may be smaller than the capacity of the high-voltage battery 21. Therefore, in a case where an electric power supplied from the low-voltage battery 23 to the traveling motor 11 when the high-voltage battery 21 is in the abnormal state is substantially equal to an electric power supplied from the high-voltage battery 21 to the traveling motor 11 when the high-voltage battery 21 is in the normal state, there is a possibility that the capacitance of the low-voltage battery 23 may be drained before the electric-powered vehicle completes the refuge-taking traveling. In contrast, in the first example embodiment, when the high-voltage battery 21 is in the abnormal state, the controller 120 may limit the supply of the electric power from the low-voltage battery 23 to the traveling motor 11 to a level lower than that held when the high-voltage battery 21 is in the normal state. This makes it possible to reduce a possibility that the capacitance of the low-voltage battery 23 is drained before the electric-powered vehicle completes the refuge-taking traveling when the high-voltage battery 21 is in the abnormal state.

Thereafter, in step S170, the controller 120 may limit supply of an electric power from the low-voltage battery 23 to the accessory 31 to a level lower than that held when the high-voltage battery 21 is in the normal state. In a specific but non-limiting example, the controller 120 may limit the supply of the electric power from the low-voltage battery 23 to the accessory 31 by controlling a limit-target accessory. The limit-target accessory may be an accessory 31 to which the limited electric power from the low-voltage battery 23 is to be supplied. For example, the controller 120 may limit the supply of the electric power from the low-voltage battery 23 to the accessory 31 by stopping an operation of the limit-target accessory.

As described above, the low-voltage battery 23 may be coupled to the accessory 31. Therefore, when the high-voltage battery 21 is in the abnormal state, an electric power from the low-voltage battery 23 may be supplied to the accessory 31 as well. In a case where an electric power supplied from the low-voltage battery 23 to the accessory 31 when the high-voltage battery 21 is in the abnormal state is substantially equal to an electric power supplied from the low-voltage battery 23 or the high-voltage battery 21 to the accessory 31 when the high-voltage battery 21 is in the normal state, there is a possibility that the capacitance of the low-voltage battery 23 may be drained before the electric-powered vehicle completes the refuge-taking traveling. In contrast, in the first example embodiment, when the high-voltage battery 21 is in the abnormal state, the controller 120 may limit the supply of the electric power from the low-voltage battery 23 to the accessory 31 to a level lower than that held when the high-voltage battery 21 is in the normal state. This makes it possible to reduce a possibility that the capacitance of the low-voltage battery 23 is drained before the electric-powered vehicle completes the refuge-taking traveling when the high-voltage battery 21 is in the abnormal state.

In this example, the controller 120 may determine the limit-target accessory with a priority on the safety of the electric-powered vehicle. In a specific but non-limiting example, the controller 120 may determine, of the accessory 31, an accessory bearing a relatively-weak relationship to the safety of the electric-powered vehicle as the limit-target accessory. The accessory bearing the relatively-weak relationship to the safety of the electric-powered vehicle may be, for example but not limited to, a device that operates to improve mainly the comfort of an occupant, such as the air conditioner, or a device that operates to improve mainly the convenience of an occupant, such as a car navigation system. This makes it possible to reduce a possibility that the capacitance of the low-voltage battery 23 is drained before the electric-powered vehicle completes the refuge-taking traveling when the high-voltage battery 21 is in the abnormal state, while allowing an accessory bearing a relatively-strong relationship to the safety of the electric-powered vehicle to be driven continuously. The accessory bearing the relative-strong relationship to the safety of the electric-power vehicle may include, for example, the hazard warning lamp, the headlight, the windshield wiper, and the communication device.

Furthermore, the controller 120 may determine the limit-target accessory with a priority on a traveling performance of the electric-powered vehicle. In a specific but non-limiting example, the controller 120 may determine, of the accessory 31, an accessory bearing a relatively-weak relationship to the traveling performance of the electric-powered vehicle as the limit-target accessory. The accessory bearing the relatively-weak relationship to the traveling performance of the electric-powered vehicle may be, for example but not limited to, a device that operates to improve mainly the comfort of an occupant, such as the air conditioner, a device that operates to improve mainly the convenience of an occupant, such as the car navigation system, or a device that operates to communicate mainly with the outside, such as the communication device. This makes it possible to reduce a possibility that the capacitance of the low-voltage battery 23 is drained before the electric-powered vehicle completes the refuge-taking traveling when the high-voltage battery 21 is in the abnormal state, while allowing an accessory bearing a relatively-strong relationship to the traveling performance of the electric-powered vehicle to be driven continuously. The accessory bearing the relatively-strong relationship to the traveling performance of the electric-powered vehicle may include, for example, the hazard warning lamp, the headlight, and the windshield wiper.

Accessories that are required to be driven while the electric-powered vehicle is being stopped may be fewer than accessories that are required to be driven while the electric-powered vehicle is traveling. For example, typically, the windshield wiper may be required to be driven relatively frequently while the electric-powered vehicle is traveling but required to be driven relatively less frequently while the electric-powered vehicle is being stopped. In the first example embodiment, the controller 120 may cause the number of limit-target accessories to be larger while the electric-powered vehicle is being stopped than while the electric-powered vehicle is traveling. This makes it possible to keep an electric power supplied from the low-voltage battery 23 to the accessory 31 while the electric-powered vehicle is being stopped lower than an electric power supplied from the low-voltage battery 23 to the accessory 31 while the electric-powered vehicle is traveling. Accordingly, it is possible to reduce a possibility that the capacitance of the low-voltage battery 23 is drained before the electric-powered vehicle completes the refuge-taking traveling.

After step S170, the controller 120 may terminate the control flow illustrated in FIG. 3.

[1-3. Example Effects of Power Source System]

Now, example effects of the power source system 1 according to the first example embodiment will be described.

An electric-powered vehicle may become unable to travel because an electric power is not supplied appropriately from a high-voltage battery to a traveling motor. In such a case, it may be desired that the electric-powered vehicle be able to take refuge at a safe location when the high-voltage battery is in the abnormal state, from the viewpoint of keeping the electric-powered vehicle from blocking a road or keeping the electric-powered vehicle from coming into contact with another vehicle from behind.

The power source system 1 according to the first example embodiment may include the traveling motor 11, the high-voltage battery 21, and the low-voltage battery 23. Furthermore, in the power source system 1, when the high-voltage battery 21 is in the abnormal state, the abnormal-time electric power supply circuit is formed in which the low-voltage battery 23 and the traveling motor 11 are coupled to each other via the step-up unit. The step-up unit is configured to step up the voltage of the low-voltage battery 23 and apply the stepped-up voltage to the traveling motor 11. Thereby, an electric power outputted from the low-voltage battery 23 may be supplied to the traveling motor 11. Accordingly, the traveling motor 11 may be able to output a motive power directed to driving of the driving wheel. This makes it possible for the electric-powered vehicle to take refuge at a safe location when the high-voltage battery 21 is in the abnormal state.

In one example embodiment, the electric-powered vehicle in which the power source system 1 is to be mounted may be an electric vehicle that includes only the traveling motor 11 serving as a driving source directed to driving of a driving wheel. Such an electric vehicle may not be able to perform the refuge-taking traveling with a driving source, such as an engine, when the high-voltage battery 21 is in the abnormal state, for example. Accordingly, applying the power source system 1 according to the first example embodiment to the electric vehicle that includes only the traveling motor 11 serving as the driving source directed to driving of the driving wheel makes it possible to effectively utilize an effect that the electric-powered vehicle is able to take refuge at a safe location when the high-voltage battery 21 is in the abnormal state.

In one example embodiment, in the power source system 1, the high-voltage battery 21 may be coupled to the traveling motor 11 via the inverter 51, the step-up device 41 may be provided between the high-voltage battery 21 and the inverter 51, the low-voltage battery 23 may be coupled, in parallel to the high-voltage battery 21, to the step-up device 41 on the side of the high-voltage battery 21 via the DC-DC converter 61, and the step-up device 41 may be coupled on the side of the high-voltage battery 21 to the low-voltage battery 23 via the switch 73 to bypass the DC-DC converter 61. When the high-voltage battery 21 is in the abnormal state, the switch 73 may be closed. This makes it possible to appropriately implement the abnormal-time electric power supply circuit with the low-voltage battery 23, the step-up device 41 serving as the step-up unit, the inverter 51, and the traveling motor 11.

In one example embodiment, the power source system 1 may include the relay 71 that allows for or cuts off electrical coupling between the high-voltage battery 21 and the abnormal-time electric power supply circuit, and the relay 71 may be opened when the high-voltage battery 21 is in the abnormal state. This makes it possible to reduce a possibility that an abnormal electric power is supplied from the high-voltage battery 21 to the step-up device 41 when the high-voltage battery 21 is in the abnormal state. This also makes it possible to suppress flowing of an electric power outputted from the low-voltage battery 23 toward the high-voltage battery 21 when the high-voltage battery 21 is in the abnormal state.

In one example embodiment, in the power source system 1, when the high-voltage battery 21 is in the normal state, the control device 100 may so control the remaining capacitance of the low-voltage battery 23 as to keep the remaining capacitance from falling below the reference capacitance corresponding to an electric power required for the electric-powered vehicle to perform the refuge-taking traveling when the high-voltage battery 21 is in the abnormal state. This makes it possible to reduce a possibility that the capacitance of the low-voltage battery 23 is drained before the electric-powered vehicle completes the refuge-taking traveling when the high-voltage battery 21 is in the abnormal state.

In one example embodiment, in the power source system 1, when the high-voltage battery 21 is in the abnormal state, the control device 100 may limit the supply of the electric power from the low-voltage battery 23 to the traveling motor 11 to a level lower than that held when the high-voltage battery 21 is in the normal state. This makes it possible to reduce a possibility that the capacitance of the low-voltage battery 23 is drained before the electric-powered vehicle completes the refuge-taking traveling because an electric power is supplied from the low-voltage battery 23 to the traveling motor 11, when the high-voltage battery 21 is in the abnormal state.

In one example embodiment, in the power source system 1, when the high-voltage battery 21 is in the abnormal state, the control device 100 may limit the supply of the electric power from the low-voltage battery 23 to the accessory 31 to a level lower than that held when the high-voltage battery 21 is in the normal state. This makes it possible to reduce a possibility that the capacitance of the low-voltage battery 23 is drained before the electric-powered vehicle completes the refuge-taking traveling because an electric power is supplied from the low-voltage battery 23 to the accessory 31, when the high-voltage battery 21 is in the abnormal state.

In one example embodiment, in the power source system 1, the control device 100 may determine the limit-target accessory with a priority on the safety of the electric-powered vehicle when the high-voltage battery 21 is in the abnormal state. This makes it possible to reduce a possibility that the capacitance of the low-voltage battery 23 is drained before the electric-powered vehicle completes the refuge-taking traveling when the high-voltage battery 21 is in the abnormal state, while allowing an accessory bearing a relatively-strong relationship to the safety of the electric-powered vehicle to be driven continuously.

In one example embodiment, in the power source system 1, the control device 100 may determine the limit-target accessory with a priority on the traveling performance of the electric-powered vehicle when the high-voltage battery 21 is in the abnormal state. This makes it possible to reduce a possibility that the capacitance of the low-voltage battery 23 is drained before the electric-powered vehicle completes the refuge-taking traveling when the high-voltage battery 21 is in the abnormal state, while allowing an accessory bearing a relatively-strong relationship to the traveling performance of the electric-powered vehicle to be driven continuously.

In one example embodiment, in the power source system 1, the control device 100 may cause the number of the limit-target accessories to be larger while the electric-powered vehicle is being stopped than while the electric-powered vehicle is traveling, when the high-voltage battery 21 is in the abnormal state. This makes it possible to keep an electric power supplied from the low-voltage battery 23 to the accessory 31 while the electric-powered vehicle is being stopped lower than an electric power supplied from the low-voltage battery 23 to the accessory 31 while the electric-powered vehicle is traveling. Accordingly, it is possible to further reduce a possibility that the capacitance of the low-voltage battery 23 is drained before the electric-powered vehicle completes the refuge-taking traveling when the high-voltage battery 21 is in the abnormal state.

[2. Second Example Embodiment]

Next, a power source system 2 according to a second example embodiment of the technology will be described. The power source system 2 according to the second example embodiment differs from the power source system 1 according to the first example embodiment in terms of the devices included in the power source system and the coupling of the devices. In the following, basically, content that is repetitive of the description of the first example embodiment will be omitted, and only the differences from the first example embodiment will be described.

[2-1. Configuration of Power Source System]

Figure 6:
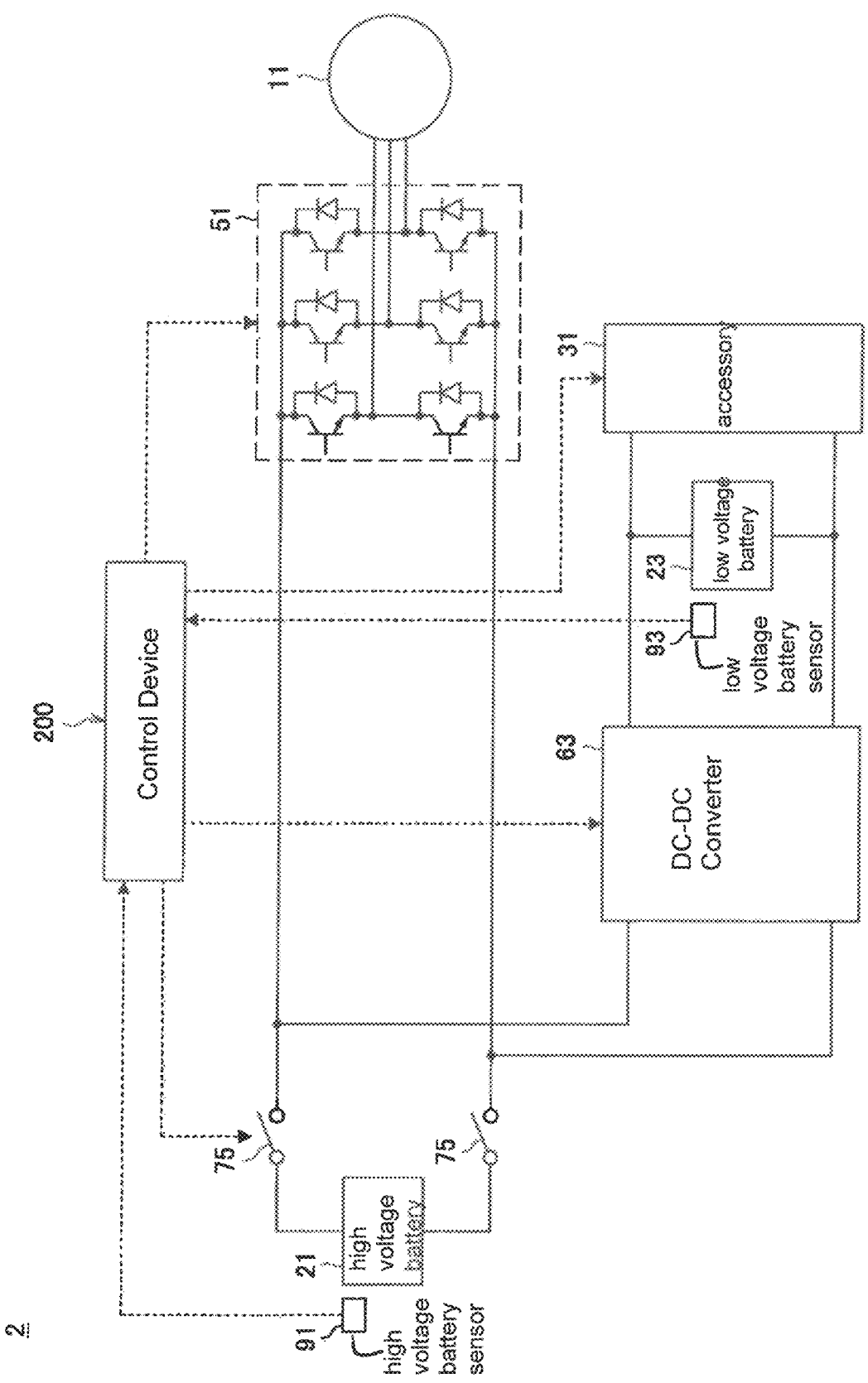
FIG. 6 is a schematic diagram illustrating an example of an outline configuration of a power source system according to one example embodiment of the technology.
Figure 7:
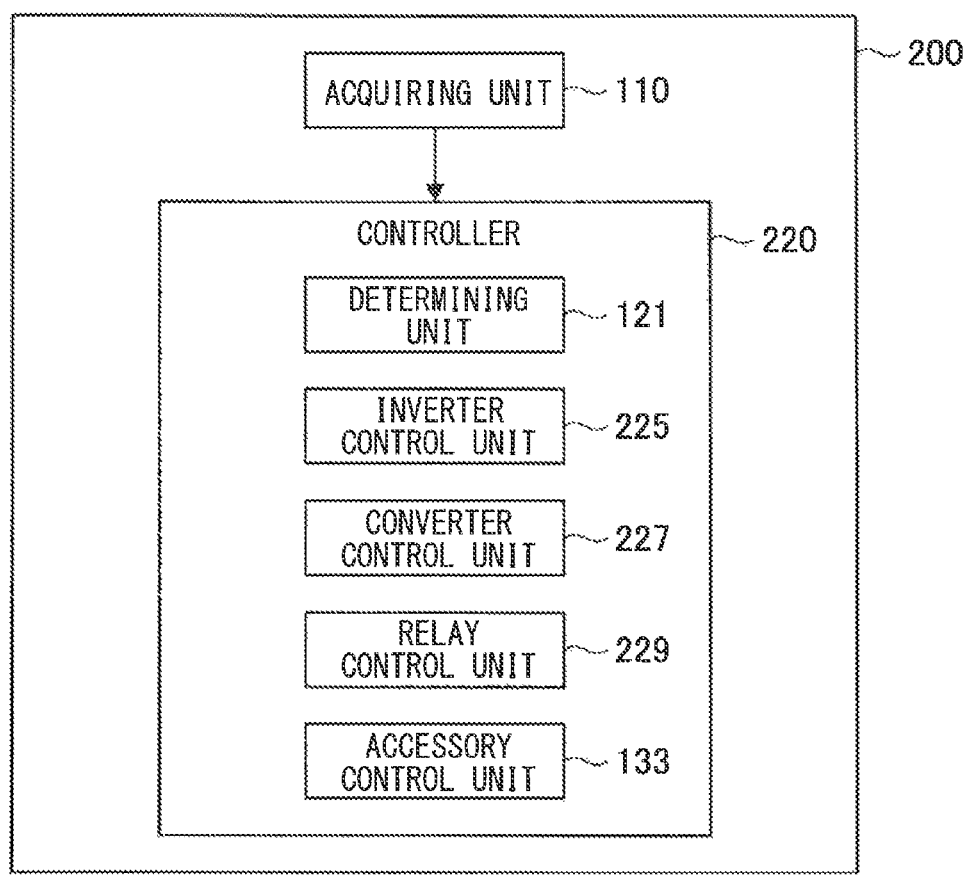
FIG. 7 is a block diagram illustrating an example of a configuration of a control device according to one example embodiment.

First, with reference to FIGS. 6 and 7, an outline configuration of the power source system 2 according to the second example embodiment will be described. FIG. 6 is a schematic diagram illustrating an example of an outline configuration of the power source system 2. FIG. 7 is a block diagram illustrating an example of a configuration of a control device 200.

As illustrated in FIG. 6, the power source system 2 may include the traveling motor 11, the high-voltage battery 21, the low-voltage battery 23, the accessory 31, a DC-DC converter 63, and a control device 200. The power source system 2 may further include the inverter 51, a relay 75, the high-voltage battery sensor 91, and the low-voltage battery sensor 93. The power source system 2 according to the second example embodiment may be mounted in an electric vehicle that includes only the traveling motor 11 as a driving source directed to driving of a driving wheel. Operations of the traveling motor 11, the high-voltage battery 21, the low-voltage battery 23, the accessory 31, the inverter 51, the high-voltage battery sensor 91, and the low-voltage battery sensor 93 may be similar to those described in the first example embodiment, and thus detailed descriptions thereof will be omitted. In one embodiment, the relay 75 may serve as the "relay."

In the power source system 2, the high-voltage battery 21 may be coupled to the traveling motor 11 via the inverter 51. Accordingly, an electric power outputted from the high-voltage battery 21 may be supplied to the traveling motor 11 via the inverter 51. In a specific but non-limiting example, the electric power outputted from the high-voltage battery 21 may be converted from a direct-current electric power to an alternating-current electric power by the inverter 51, and the converted alternating-current electric power may be supplied to the traveling motor 11. In this example, the relay 75 may be provided between the high-voltage battery 21 and the inverter 51. The relay 75 may be configured to allow for or cut off electrical coupling between the high-voltage battery 21 and the inverter 51. A precharge resistance and a precharge relay may be provided in parallel to the relay 75, from the viewpoint of protecting the power source system 2 from an inrush current of the high-voltage battery 21 generated when the relay 75 opens or closes.

Furthermore, in the power source system 2, the low-voltage battery 23 may be coupled to the inverter 51 in parallel to the high-voltage battery 21 via the DC-DC converter 63. Accordingly, an electric power outputted from the high-voltage battery 21 may be supplied to the low-voltage battery 23 via the DC-DC converter 63. In a specific but non-limiting example, the voltage of the high-voltage battery 21 may be stepped down by the DC-DC converter 63, and the stepped-down voltage may be applied to the low-voltage battery 23.

The DC-DC converter 63 is an electric power converter that is configured to step down a voltage of the high-voltage battery 21 and apply the stepped-down voltage to the low-voltage battery 23 and also configured to step up a voltage the low-voltage battery 23 and apply the stepped-up voltage to the inverter 51. The DC-DC converter 63 may include a step-down circuit directed to voltage step-down and a step-up circuit directed to voltage step-up, for example. The step-down circuit and the step-up circuit may be disposed in parallel to each other. The DC-DC converter 63 may include a switching element, for example. The step-down circuit or the step-up circuit may be selectively used by controlling of an operation of the switching element. This may cause a voltage to be stepped down or stepped up.

In one embodiment, the DC-DC converter 63 may serve as the "step-up unit." In the power source system 2, the DC-DC converter 63 may serve as a step-up unit that is able to step up the voltage of the low-voltage battery 23 and apply the stepped-up voltage to the traveling motor 11 when the high-voltage battery 21 is in the abnormal state.

As with the control device 100, the control device 200 may include: for example, a CPU which is an arithmetic processing device; a ROM which is a storage device that holds, for example but not limited to, a program and an arithmetic parameter to be used by the CPU; and a RAM which is a storage device that temporarily holds, for example but not limited to, a parameter that varies as appropriate when the CPU executes an operation.

The control device 200 may communicate with each device included in the power source system 2. The control device 200 may communicate with each device through the CAN communication, for example.

A portion or all of operations of the control device 200 according to the second example embodiment may be distributed to a plurality of control devices, or a plurality of operations may be performed by a single control device in an integrated manner. For example, the operations of the control device may include determining the abnormal state of the high-voltage battery 21, controlling an operation of the DC-DC converter 63, and any other operation, and the aforementioned operations may be distributed to separate control devices. In a case where a portion or all of the operations of the control device 200 are distributed to a plurality of control devices, these control devices may be coupled to each other via a communication bus, such as the CAN.

As illustrated in FIG. 7, the control device 200 may include the acquiring unit 110 and a controller 220. An operation of the acquiring unit 110 may be similar to that described in the first example embodiment, and thus detailed descriptions thereof will be omitted. In one embodiment, the controller 220 may serve as the "controller."

The controller 220 may control an operation of each device in the power source system 2. The controller 220 may include the determining unit 121, an inverter control unit 225, a converter control unit 227, a relay control unit 229, and the accessory control unit 133. Operations of the determining unit 121 and the accessory control unit 133 may be similar to those described in the first example embodiment, and thus detailed descriptions thereof will be omitted.

The inverter control unit 225 may control an operation of the inverter 51. In a specific but non-limiting example, the inverter control unit 225 may control an operation of the switching element in the inverter 51. Thereby, the inverter control unit 225 may control conversion and supply of an electric power between the high-voltage battery 21 and the traveling motor 11. Furthermore, as will be described later, the inverter control unit 225 may control conversion and supply of an electric power between the DC-DC converter 63 and the traveling motor 11 when the high-voltage battery 21 is in the abnormal state.

The converter control unit 227 may control an operation of the DC-DC converter 63. In a specific but non-limiting example, the converter control unit 227 may control the operation of the DC-DC converter 63 by controlling an operation of the switching element in the DC-DC converter 63. Thereby, the converter control unit 227 may control conversion and supply of an electric power between the high-voltage battery 21 and the low-voltage battery 23. Furthermore, the converter control unit 227 may control conversion and supply of an electric power between the low-voltage battery 23 and the inverter 51 when the high-voltage battery 21 is in the abnormal state.

The relay control unit 229 may control an operation of the relay 75. For example, the relay control unit 229 may control an opening-closing operation of the relay 75 by controlling an operation of an unillustrated driving device that drives the relay 75.

As in the power source system 1 according to the first example embodiment, in the power source system 2 according to the second example embodiment, when the high-voltage battery 21 is in the abnormal state, an abnormal-time electric power supply circuit may be formed in which the low-voltage battery 23 and the traveling motor 11 are coupled to each other via a step-up unit. The step-up unit may be configured to step up the voltage of the low-voltage battery 23 and apply the stepped-up voltage to the traveling motor 11. In a specific but non-limiting example, in the power source system 2 according to the second example embodiment, when the high-voltage battery 21 is in the abnormal state, a circuit may be formed in which the low-voltage battery 23 and the traveling motor 11 are coupled to each other via the DC-DC converter 63 serving as a "step-up unit". This circuit may also be referred to below as a "second abnormal-time electric power supply circuit." This circuit may allow the electric-powered vehicle to take refuge at a safe location when the high-voltage battery 21 is in the abnormal state. Details of forming such a circuit will be described below. In one embodiment, the second abnormal-time electric power supply circuit may serve as an "abnormal-time electric power supply circuit."

[2-2. Operation of Power Source System]

Figure 8:
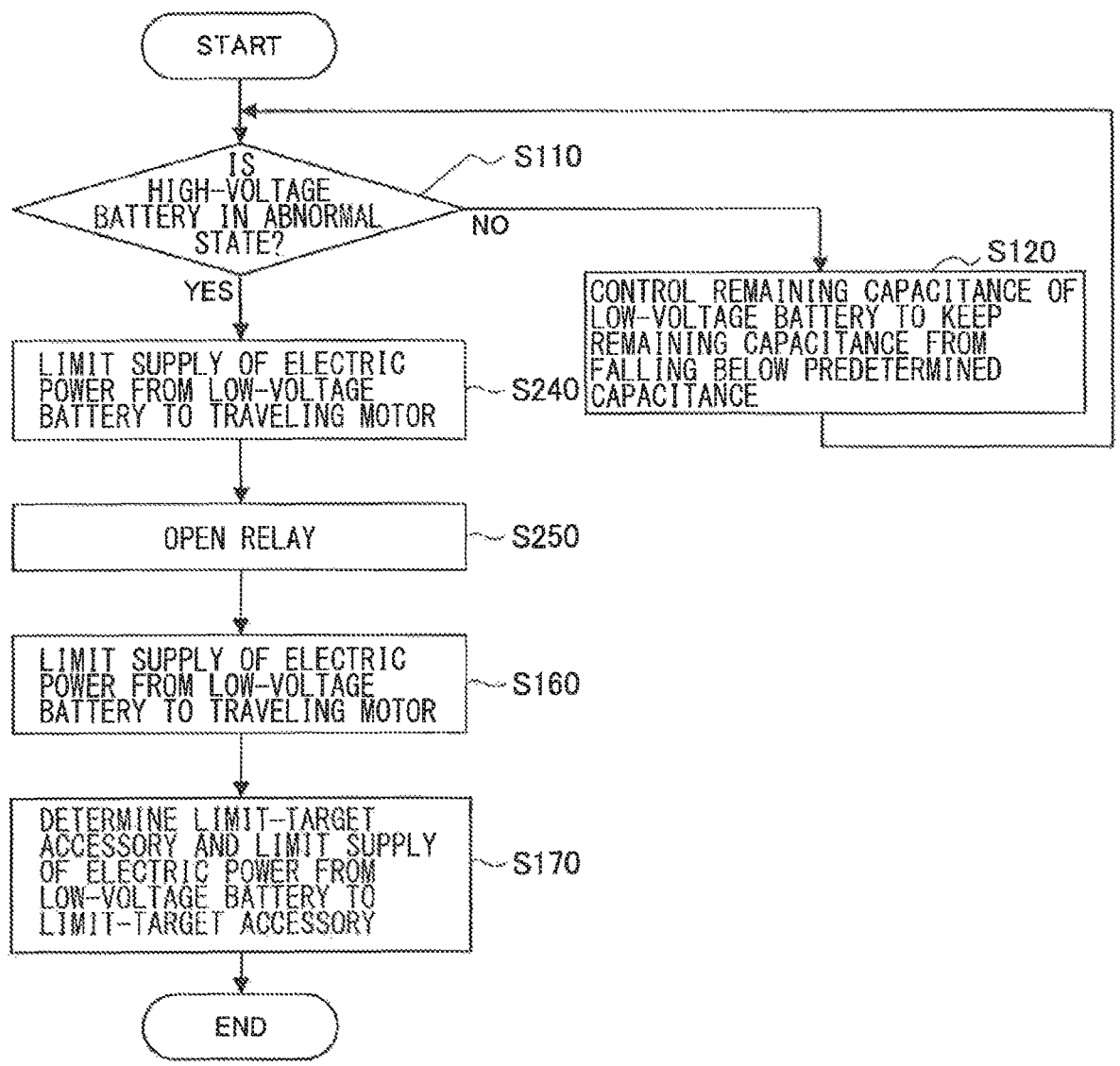
FIG. 8 is a flowchart illustrating an example of a flow of a process performed by the control device according to one example embodiment.
Figure 9:
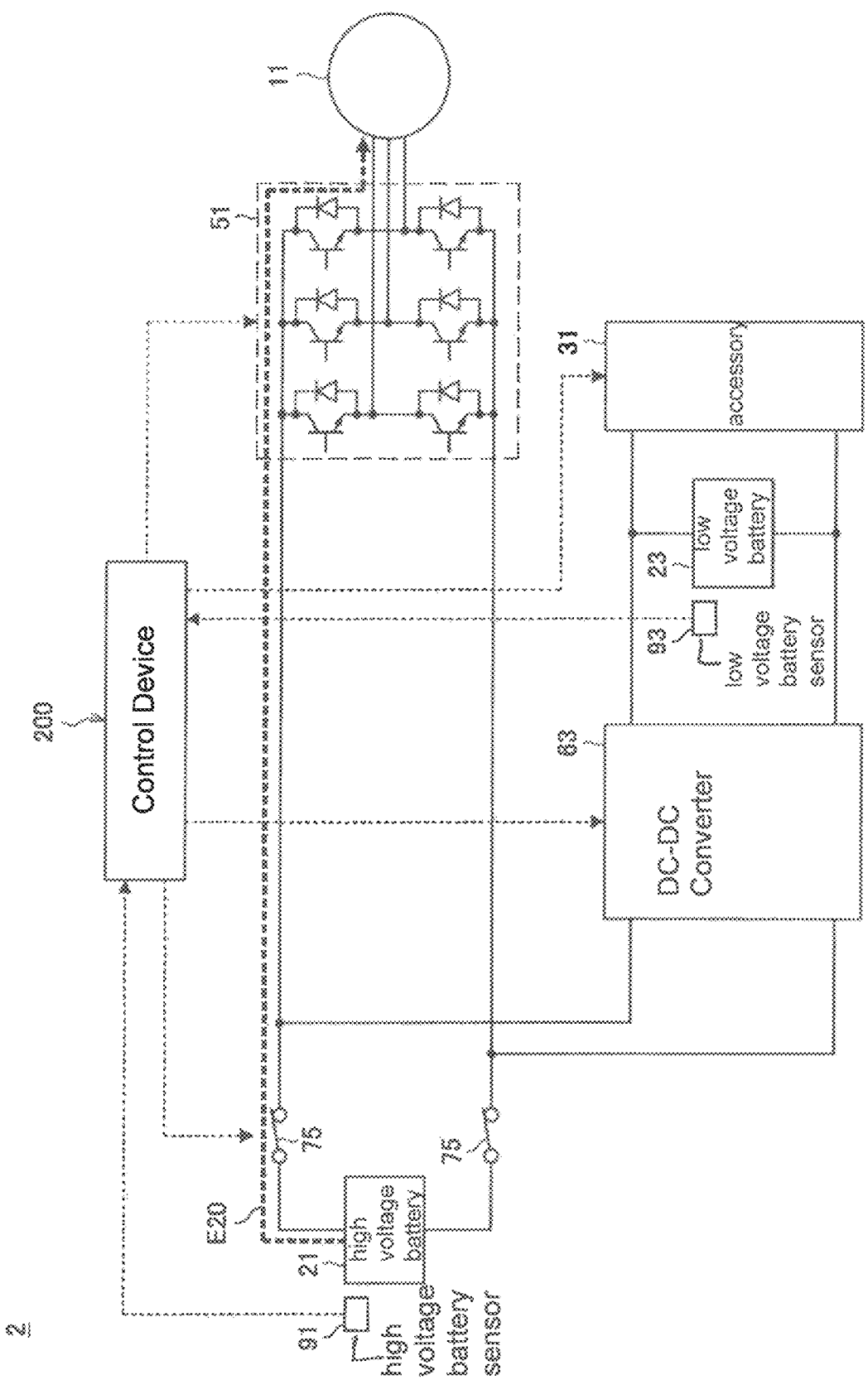
FIG. 9 is a schematic diagram illustrating an example of a state in which an electric power is supplied to a traveling motor in the power source system according to one example embodiment when the high-voltage battery is in the normal state.
Figure 10:
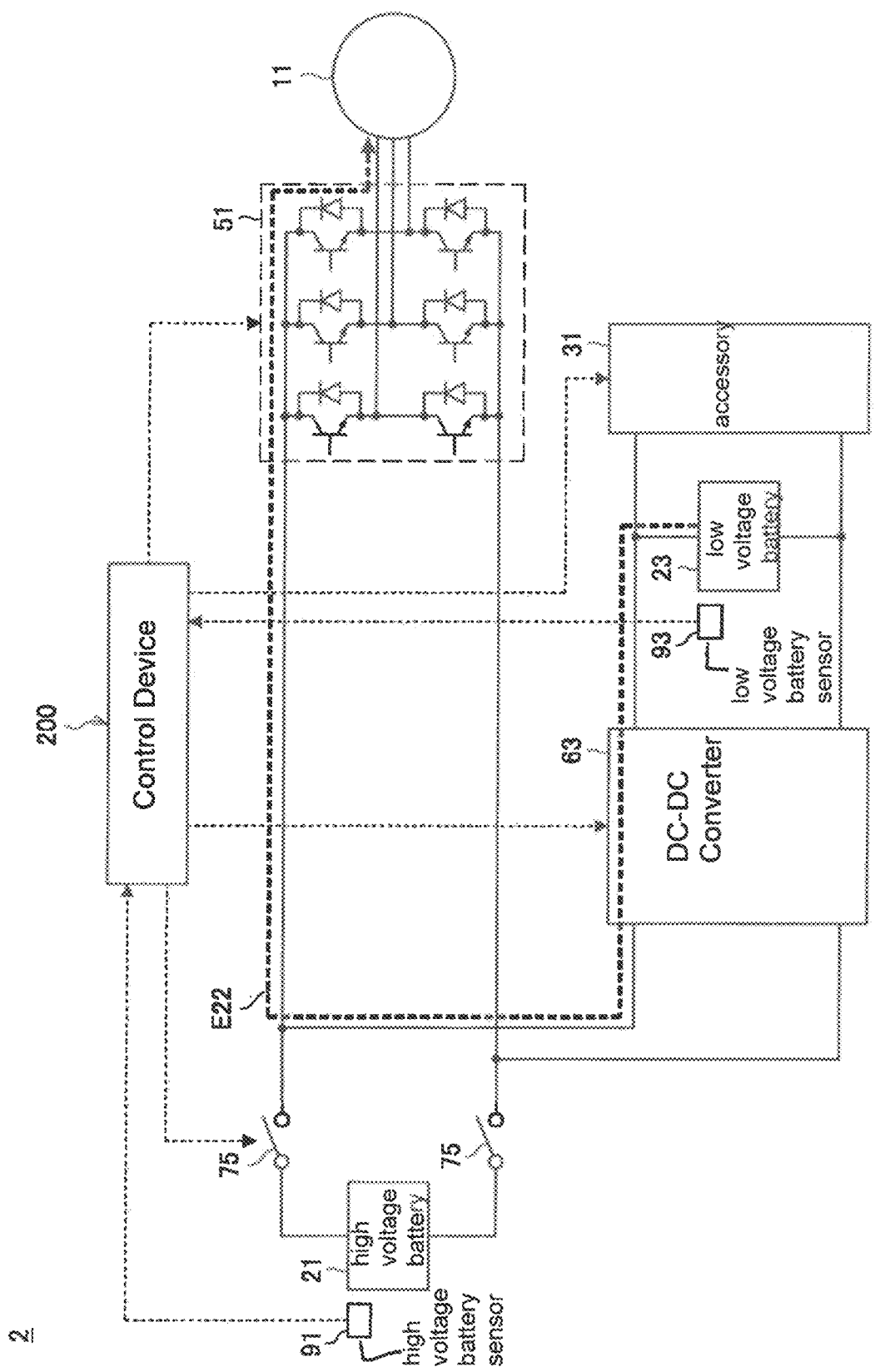
FIG. 10 is a schematic diagram illustrating an example of a state in which an electric power is supplied to the traveling motor in the power source system according to one example embodiment when the high-voltage battery is in the abnormal state.

With reference to FIGS. 8 to 10, an operation of the power source system 2 according to the second example embodiment will be described.

FIG. 8 is a flowchart illustrating an example of a flow of a process performed by the control device 200. In a specific but non-limiting example, the control flow illustrated in FIG. 8 may start when the power source system 2 is started. FIG. 9 is a schematic diagram illustrating an example of a state in which an electric power is supplied to the traveling motor 11 in the power source system 2 at a time when the high-voltage battery 21 is in the normal state. FIG. 10 is a schematic diagram illustrating an example of a state in which an electric power is supplied to the traveling motor 11 in the power source system 2 at a time when the high-voltage battery 21 is in the abnormal state.

When the control flow illustrated in FIG. 8 is started, first, in step S110, the controller 220 may determine whether the high-voltage battery 21 is in the abnormal state. In a case where it is determined that the high-voltage battery 21 is in the abnormal state (YES in step S110), the control flow may proceed to step S240. In contrast, in a case where it is determined that the high-voltage battery 21 is in the normal state (NO in step S110), the control flow may proceed to step S120. The process of determining whether the high-voltage battery 21 is in the abnormal state may be similar to that described in the first example embodiment, and thus detailed descriptions thereof will be omitted.

Now, with reference to FIG. 9, a flow of an electric power in the power source system 2 at a time when the high-voltage battery 21 is in the normal state will be described. As illustrated in FIG. 9, when the high-voltage battery 21 is in the normal state, the relay 75 may be closed. While the relay 75 is closed, the high-voltage battery 21 and the inverter 51 may be coupled to each other. Therefore, as illustrated in FIG. 9, a circuit may be formed in which the high-voltage battery 21 and the traveling motor 11 are coupled to each other via the inverter 51. In one embodiment, this circuit may serve as the "normal-time electric power supply circuit." Furthermore, the controller 220 may so control an operation of the inverter 51 as to supply an electric power outputted from the high-voltage battery 21 to the traveling motor 11 via the inverter 51. Thereby, as indicated by an arrow E20 illustrated in FIG. 9, an electric power outputted from the high-voltage battery 21 may be supplied to the traveling motor 11 via the inverter 51. Supplying of the electric power outputted from the high-voltage battery 21 to the traveling motor 11 in this manner may allow the traveling motor 11 to output a motive power directed to driving of a driving wheel. Furthermore, the controller 220 may so control the DC-DC converter 63 as to supply an electric power outputted from the high-voltage battery 21 to the low-voltage battery 23 via the DC-DC converter 63. Thereby, the electric power outputted from the high-voltage battery 21 may be supplied to the low-voltage battery 23 via the DC-DC converter 63, and the low-voltage battery 23 may be charged.

Referring back to FIG. 8, the description of the flow of the process performed by the control device 200 will continue. In a case where the determination is NO in step S110, that is, in a case where the high-voltage battery 21 is in the normal state, in step S120, the controller 220 may control the remaining capacitance of the low-voltage battery 23 to keep the remaining capacitance from falling below a predetermined capacitance. The process of keeping the remaining capacitance of the low-voltage battery 23 from falling below the predetermined capacitance may be similar to that described in the first example embodiment, and thus detailed descriptions thereof will be omitted.

In a case where the determination is YES in step S110, that is, in a case where the high-voltage battery 21 is in the abnormal state, in step S240, the controller 220 may control supply of an electric power from the low-voltage battery 23 to the traveling motor 11. In a specific but non-limiting example, the controller 220 may so control an operation of the DC-DC converter 63 and an operation of the inverter 51 as to supply the electric power outputted from the low-voltage battery 23 to the traveling motor 11 via the DC-DC converter 63 and the inverter 51.

Now, with reference to FIG. 10, flowing of an electric power in the power source system 2 at a time when the high-voltage battery 21 is in the abnormal state will be described. As described above, when the high-voltage battery 21 is in the abnormal state, the controller 220 may so control an operation of the DC-DC converter 63 and an operation of the inverter 51 as to supply an electric power outputted from the low-voltage battery 23 to the traveling motor 11 via the DC-DC converter 63 and the inverter 51. In a more specific but non-limiting example, the controller 220 may step up the voltage of the low-voltage battery 23 and apply the stepped-up voltage to the inverter 51 by controlling an operation of the DC-DC converter 63. Furthermore, the controller 220 may convert a direct-current electric power to an alternating-current electric power and supply the converted alternating-current electric power to the traveling motor 11 by controlling the operation of the inverter 51. Thereby, the second abnormal-time electric power supply circuit may be formed in which the low-voltage battery 23 and the traveling motor 11 are electrically coupled to each other via the DC-DC converter 63 and the inverter 51. Accordingly, as indicated by an arrow E22 illustrated in FIG. 10, an electric power outputted from the low-voltage battery 23 may be supplied to the traveling motor 11 via the DC-DC converter 63 and the inverter 51. Supplying of the electric power outputted from the low-voltage battery 23 to the traveling motor 11 in this manner may allow the traveling motor 11 to output a motive power directed to driving of the driving wheel. This may allow the electric-powered vehicle to take refuge at a safe location when the high-voltage battery 21 is in the abnormal state.

Referring back to FIG. 8, the description of the flow of the process performed by the control device 200 will continue.

After step S240, in step S250, the controller 220 may open the relay 75.

Opening the relay 75 may cut off electrical coupling between the high-voltage battery 21 and the second abnormal-time electric power supply circuit. This makes it possible to reduce a possibility that an abnormal electric power is supplied from the high-voltage battery 21 to the inverter 51 when the high-voltage battery 21 is in the abnormal state. This also makes it possible to suppress flowing of an electric power outputted from the low-voltage battery 23 to the high-voltage battery 21 when the high-voltage battery 21 is in the abnormal state.

Furthermore, opening the relay 75 after an electric power starts being supplied from the low-voltage battery 23 to the traveling motor 11 makes it possible to suppress any temporary cutoff of an electric power supplied to the traveling motor 11. In other words, it is possible to keep the traveling motor 11 from losing its power source.

After step S250, the control flow illustrated in FIG. 8 may proceed to step S160. The control flow from step S160 may be similar to that described in the first example embodiment, and thus detailed descriptions thereof will be omitted.

[2-3. Example Effects of Power Source System]

Now, example effects of the power source system 2 according to the second example embodiment will be described.

In one example embodiment, in the power source system 2, the high-voltage battery 21 may be coupled to the traveling motor 11 via the inverter 51, and the low-voltage battery 23 may be coupled to the traveling motor 11 in parallel to the high-voltage battery 21 via the inverter 51 and the DC-DC converter 63. When the high-voltage battery 21 is in the abnormal state, the voltage of the low-voltage battery 23 may be stepped up by controlling of an operation of the DC-DC converter 63, and the stepped-up voltage may be applied to the inverter 51. This makes it possible to appropriately implement an abnormal-time electric power supply circuit with the low-voltage battery 23, the DC-DC converter 63 serving as a step-up unit, the inverter 51, and the traveling motor 11.

[3. Conclusion]

Thus far, some example embodiments of the technology have been described in detail with reference to the appended drawings, but the technology is not limited to the above examples. It is apparent that any person having ordinary knowledge in the technical field to which the technology belongs is able to conceive of various modification examples and alternation examples within the technical idea set forth in the appended claims, and it should be appreciated that these modification examples and alternation examples are encompassed by the technical scope of the technology.

For example, the processes described with reference to the flowcharts in the present specification do not necessarily need to be executed in the order indicated in the flowcharts. Some of the processing steps may be executed in parallel. Furthermore, an additional processing step may be employed, or one or more of the processing steps may be omitted.

Furthermore, the configuration of the power source system according to an example embodiment of the technology is not particularly limited to the examples of the foregoing example embodiments and the drawings, for example. For example, in the foregoing example embodiments, a step-up device and a DC-DC converter that are each of a non-insulated type with no insulation between input side and output side have been described above as examples. In an alternative example, a step-up device or a DC-DC converter of an insulated type with insulation between input side and output side may be employed.

As described above, according to one embodiment of the technology, it is possible to cause an electric-powered vehicle to take refuge at a safe location when a high-voltage battery is in an abnormal state.

Each of the controller 120, the determining unit 121, the step-up device control unit 123, the inverter control unit 125, the converter control unit 127, the relay control unit 129, the switch control unit 131, and the accessory control unit 133 illustrated in FIG. 2 and each of the controller 220, the inverter control unit 225, the converter control unit 227, and the relay control unit 229 illustrated in FIG. 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the controller 120, the determining unit 121, the step-up device control unit 123, the inverter control unit 125, the converter control unit 127, the relay control unit 129, the switch control unit 131, and the accessory control unit 133 illustrated in FIG. 2 and each of the controller 220, the inverter control unit 225, the converter control unit 227, and the relay control unit 229 illustrated in FIG. 7. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the controller 120, the determining unit 121, the step-up device control unit 123, the inverter control unit 125, the converter control unit 127, the relay control unit 129, the switch control unit 131, and the accessory control unit 133 illustrated in FIG. 2 and each of the controller 220, the inverter control unit 225, the converter control unit 227, and the relay control unit 229 illustrated in FIG. 7.

The invention claimed is:

1. A power source system for an electric-powered vehicle, the electric-powered vehicle including a traveling motor, the power source system comprising:
a high-voltage battery configured to store an electric power to be supplied to the traveling motor;
a low-voltage battery configured to store an electric power to be supplied to an accessory provided in the electric-powered vehicle;
a step-up unit interposed between the low-voltage battery and the traveling motor, the step-up unit being configured to step up a voltage of the low-voltage battery and apply the stepped-up voltage to the traveling motor; and
a controller configured to perform switching to a normal-time electric power supply circuit when the high-voltage battery is in a normal state and perform switching to an abnormal-time electric power supply circuit when the high-voltage battery is detected in an abnormal state, the normal-time electric power supply circuit being a circuit in which the high-voltage battery and the traveling motor are coupled to each other, the abnormal-time electric power supply circuit being a circuit in which the low-voltage battery and the traveling motor are coupled to each other via the step-up unit.

2. The power source system for an electric-powered vehicle according to claim 1, wherein the electric-powered vehicle comprises an electric vehicle that includes only the traveling motor as a driving source directed to driving of a driving wheel.

3. The power source system for an electric-powered vehicle according to claim 1, further comprising:
an inverter interposed between the high-voltage battery and the traveling motor;
a step-up device interposed between the high-voltage battery and the inverter;
a DC-DC converter interposed between the low-voltage battery and high-voltage battery side of the step-up device to step down a voltage of the high-voltage battery and apply the stepped-down voltage to the low-voltage battery; and
a switch configured to allow the low-voltage battery to be coupled to the high-voltage battery side of the step-up device with the DC-DC converter being bypassed, wherein
the controller is further configured to close, when the high-voltage battery is in the abnormal state, the switch to form the abnormal-time electric power supply circuit in which the low-voltage battery is coupled to the traveling motor via the step-up device and the inverter with the DC-DC converter being bypassed, the step-up device serving as the step-up unit.

4. The power source system for an electric-powered vehicle according to claim 2, further comprising:
an inverter interposed between the high-voltage battery and the traveling motor;
a step-up device interposed between the high-voltage battery and the inverter;
a DC-DC converter interposed between the low-voltage battery and high-voltage battery side of the step-up device to step down a voltage of the high-voltage battery and apply the stepped-down voltage to the low-voltage battery; and
a switch configured to allow the low-voltage battery to be coupled to the high-voltage battery side of the step-up device with the DC-DC converter being bypassed, wherein
the controller is further configured to close, when the high-voltage battery is in the abnormal state, the switch to form the abnormal-time electric power supply circuit in which the low-voltage battery is coupled to the traveling motor via the step-up device and the inverter with the DC-DC converter being bypassed, the step-up device serving as the step-up unit.

5. The power source system for an electric-powered vehicle according to claim 1, further comprising:
an inverter interposed between the high-voltage battery and the traveling motor; and
a DC-DC converter interposed between the low-voltage battery and high-voltage battery side of the inverter, the DC-DC converter being configured to step down a voltage of the high-voltage battery and apply the stepped-down voltage to the low-voltage battery, the DC-DC converter being configured to step up the voltage of the low-voltage battery and apply the stepped-up voltage to the inverter, wherein
the controller is further configured to form, when the high-voltage battery is in the abnormal state, the abnormal-time electric power supply circuit in which the low-voltage battery is coupled to the traveling motor via the DC-DC converter and the inverter, the DC-DC converter serving as the step-up unit.

6. The power source system for an electric-powered vehicle according to claim 2, further comprising:
an inverter interposed between the high-voltage battery and the traveling motor; and
a DC-DC converter interposed between the low-voltage battery and high-voltage battery side of the inverter, the DC-DC converter being configured to step down a voltage of the high-voltage battery and apply the stepped-down voltage to the low-voltage battery, the DC-DC converter being configured to step up the voltage of the low-voltage battery and apply the stepped-up voltage to the inverter, wherein
the controller is further configured to form, when the high-voltage battery is in the abnormal state, the abnormal-time electric power supply circuit in which the low-voltage battery is coupled to the traveling motor via the DC-DC converter and the inverter, the DC-DC converter serving as the step-up unit.

7. The power source system for an electric-powered vehicle according to claim 1, further comprising
a relay configured to allow for or cut off electrical coupling between the high-voltage battery and the abnormal-time electric power supply circuit, wherein
the controller is further configured to open the relay when the high-voltage battery is in the abnormal state.

8. The power source system for an electric-powered vehicle according to claim 2, further comprising
a relay configured to allow for or cut off electrical coupling between the high-voltage battery and the abnormal-time electric power supply circuit, wherein
the controller is further configured to open the relay when the high-voltage battery is in the abnormal state.

9. The power source system for an electric-powered vehicle according to claim 1, wherein the controller is further configured to limit, when the high-voltage battery is in the abnormal state, the electric power to be supplied to the traveling motor to a level lower than a level held when the high-voltage battery is in the normal state.

10. The power source system for an electric-powered vehicle according to claim 2, wherein the controller is further configured to limit, when the high-voltage battery is in the abnormal state, the electric power to be supplied to the traveling motor to a level lower than a level held when the high-voltage battery is in the normal state.

11. The power source system for an electric-powered vehicle according to claim 1, wherein the controller is further configured to limit, when the high-voltage battery is in the abnormal state, the electric power to be supplied to the accessory to a level lower than a level held when the high-voltage battery is in the normal state.

12. The power source system for an electric-powered vehicle according to claim 2, wherein the controller is further configured to limit, when the high-voltage battery is in the abnormal state, the electric power to be supplied to the accessory to a level lower than a level held when the high-voltage battery is in the normal state.

13. The power source system for an electric-powered vehicle according to claim 11, wherein the controller is further configured to determine a limit-target accessory with a priority on safety of the electric-powered vehicle, the limit-target accessory being the accessory to which the limited electric power is to be supplied when the high-voltage battery is in the abnormal state.

14. The power source system for an electric-powered vehicle according to claim 11, wherein the controller is further configured to determine a limit-target accessory with a priority on a traveling performance of the electric-powered vehicle, the limit-target accessory being the accessory to which the limited electric power is to be supplied when the high-voltage battery is in the abnormal state.

15. The power source system for an electric-powered vehicle according to claim 13, wherein the controller is further configured to cause, when the high-voltage battery is in the abnormal state, number of the limit-target accessory to be larger while the electric-powered vehicle is being stopped than while the electric-powered vehicle is traveling.

16. The power source system for an electric-powered vehicle according to claim 1, wherein the controller is further configured to control, when the high-voltage battery is in the normal state, a remaining capacitance of the low-voltage battery to keep the remaining capacitance from falling below a reference capacitance, the reference capacitance corresponding to a lower-limit electric power required for the electric-powered vehicle to perform refuge-taking traveling when the high-voltage battery is in the abnormal state.

17. The power source system for an electric-powered vehicle according to claim 2, wherein the controller is further configured to control, when the high-voltage battery is in the normal state, a remaining capacitance of the low-voltage battery to keep the remaining capacitance from falling below a reference capacitance, the reference capacitance corresponding to a lower-limit electric power required for the electric-powered vehicle to perform refuge-taking traveling when the high-voltage battery is in the abnormal state.

18. The power source system for an electric-powered vehicle according to claim 1, wherein the controller is further configured to limit, when the high-voltage battery is in the abnormal state, the electric power to be supplied to an accessory to a level lower than a level held when the high-voltage battery is in the normal state.

19. A power source system for an electric-powered vehicle, the electric-powered vehicle including a traveling motor, the power source system comprising:
- a high-voltage battery configured to supply an electric power to the traveling motor;
- a low-voltage battery coupled to the traveling motor in parallel to the high-voltage battery, the low-voltage battery having a lower voltage than the high-voltage battery;
- a step-up unit interposed between the low-voltage battery and the traveling motor, the step-up unit being configured to step up a voltage of the low-voltage battery and apply the stepped-up voltage to the traveling motor; and
- a controller configured to perform switching of an electric power source that supplies an electric power to the traveling motor between a time when the high-voltage battery is in a normal state and a time when the high-voltage battery is detected in an abnormal state, the controller being configured to select the high-voltage battery as the electric power source when the high-voltage battery is in the normal state and select the low-voltage battery as the electric power source when the high-voltage battery is in the abnormal state.

20. The power source system for an electric-powered vehicle according to claim 19, wherein the controller is further configured to control, when the high-voltage battery is in the normal state, a remaining capacitance of the low-voltage battery to keep the remaining capacitance from falling below a reference capacitance.

* * * * *